US007002886B2

United States Patent
Chu et al.

(10) Patent No.: US 7,002,886 B2
(45) Date of Patent: Feb. 21, 2006

(54) SIL NEAR-FIELD FLYING HEAD STRUCTURE TO CONTROL GAP BETWEEN DISC AND SIL WITH THREE SENSOR POINTS IN FRONT OF LENS HOLDER

(75) Inventors: Yi-Ming Chu, Kaohsiung (TW); Jian-Shian Lin, Ilan (TW); Shih-Che Lo, Ilan (TW)

(73) Assignee: Industrial Technology Research Institute, Hsinchu (TW)

( * ) Notice: Subject to any disclaimer, the term of this patent is extended or adjusted under 35 U.S.C. 154(b) by 602 days.

(21) Appl. No.: 10/301,611

(22) Filed: Nov. 22, 2002

(65) Prior Publication Data

US 2004/0100878 A1    May 27, 2004

(51) Int. Cl.
*G11B 7/095* (2006.01)
(52) U.S. Cl. ............... 369/53.19; 369/112.23
(58) Field of Classification Search .......... 369/53.19, 369/112.23
See application file for complete search history.

(56) References Cited

U.S. PATENT DOCUMENTS 5,812,721 A * 9/1998 Ingvarsson et al. ......... 385/115

* cited by examiner

*Primary Examiner*—Gautam R. Patel
(74) *Attorney, Agent, or Firm*—Bacon & Thomas PLLC

(57) ABSTRACT

The present invention is to disclose a SIL near-field flying head flying state control structure in which the SIL is installed in a lens holder that can be biased. The lens holder includes three detection points spaced around the SIL for detecting the distance between each detection point and an optical disk, and a number of single-axis displacement devices for controlling the corresponding lateral side of the lens holder to move axially relative to the optical disk. A server can control the single-axis displacement devices to adjust the posture of the lens holder subject to the distance between each detection point and the optical disk measured, keeping the parallelism between the SIL and the optical disk within a predetermined level.

10 Claims, 1 Drawing Sheet

SIL NEAR-FIELD FLYING HEAD STRUCTURE TO CONTROL GAP BETWEEN DISC AND SIL WITH THREE SENSOR POINTS IN FRONT OF LENS HOLDER

BACKGROUND OF THE INVENTION

1. Field of the Invention

The present invention relates to the field of optical recording technology and, more specifically, to a SIL (solid immersion lens) near-field flying head flying state control structure.

2. Description of the Related Art

Due to strong market demand for high capacity of optical disks (such as CDs, VCDs, DVDs, and etc.), optical disk manufacturers have not stopped trying to find a method to increase the storage capacity of an optical disk without increasing its size. Currently, there are techniques disclosed to improve optical disk recording density. FIG. 1 illustrates a prior art technique called "near-field recording", which reduces the size of the laser light spot of the optical flying head 80, so that a relatively thinner signal track can be exposed on the optical disk 90. The optical flying head 80 comprises a slider 81 controlled by a servo to fly above the optical disk 90 at a very low altitude, a semispherical SIL (solid immersion lens) 82 located on the front side of the slider 81, and a focusing lens 83 provided inside the slider 81. The focusing lens 83 focuses the laser beam onto the SIL 82, causing the laser beam to produce a total internal reflection at the front tangent plane 84 of the SIL 82 and, at the same time, an evanescent wave is produced and passed through the front tangent plane 84 of the SIL 82 to expose the optical disk 90.

Because the aforesaid evanescent wave attenuates gradually in index subject to its forwarding distance, the SIL 82 must be precisely controlled in close proximity to the optical disk 90 so that high stability of exposure action can be achieved (remark: normally, the distance between the front tangent plane 84 of the SIL 82 and the photoresist of the optical disk 90 is maintained within 100 nm). The optical flying head 80 shown in FIG. 1 uses aerodynamics to manipulate the flying action of the slider 81 (the so-called "air pad"). According to this method, an outer air passage 86 and an inner air passage 85 are provided in the front side of the slider 81 around the SIL 82, and then compressed air is ejected out of the outer air passage 86 when the inner air passage 85 absorbing air. By means of the aforesaid actions, a constant air gap (about 1 $\mu$m) is maintained between the slider 81 and the optical disk 90. Further, an annular piezoelectric material 87 is bonded to the slider 81, forming a lens set. When applying a high voltage to the piezoelectric material 87, the SIL 82 is pushed toward the optical disk 90 to the near-field distance. During working, the amount of total internal reflection is indicative of the distance between the SIL 82 and the optical disk 90 (remark: when the SIL 82 reaching the near-field distance, the amount of total internal reflection is relatively reduced). Therefore, the amount of the high voltage applied to the piezoelectric material 87 is controlled subject to the amount of total internal reflection measured.

However, the aforesaid method can only measure the distance between the center point of the front tangent plane 84 of the SIL 82 and the optical disk 90 for use to control the displacement of the SIL 82 in one axis (the vertical direction in FIG. 1). This method cannot judge the posture of the SIL 82. When the SIL 82 tilted relative to the optical disk 90, the aforesaid prior art mechanism cannot detect and correct the tilted posture of the SIL 82. As indicated above, the aforesaid evanescent wave disperses subject to the change of the distance at a fast speed. Therefore, tilting of the SIL 82 affects near-field exposure quality. Further, because the distance between the SIL 82 and the optical disk 90 is very short, tilting of the SIL 82 may cause the peripheral edge of the front tangent plane 84 to touch the optical disk 90. Therefore, the precision requirement of the aforesaid prior art optical flying head 80 on the parallelism between the lens set and the slider 81 in actual practice is critical (the precision of 1 mrad is the minimum). This precision requirement results in high fabrication difficulty and low product yield rate.

SUMMARY OF THE INVENTION

The present invention has been accomplished to provide a SIL (solid immersion lens) near-field flying head flying state control structure, which eliminates the aforesaid drawbacks. It is the main object of the present invention to provide a SIL near-field flying head flying state control structure, which detects and correct the posture of the SIL, so as to keep the SIL and the optical disk in a high parallelism, achieving a stable and accurate exposure operation and preventing contact of the SIL with the optical disk.

It is another object of the present invention to provide a SIL near-field flying head flying state control structure, which is easy to fabricate.

According to the SIL near-field flying head flying state control structure of the present invention, a slider of the flying head comprises a base to be maintained at a distance in close proximity to an optical disk and a lens holder to be biasing elative to the base. An SIL and a focusing lens of the flying head are fixedly provided in the front side of the lens holder close to the optical disk. The lens holder has at least three detection points spaced around the SIL for detecting the distance between each detection point and the optical disk, and a number of single-axis displacement devices for controlling the corresponding lateral side of the lens holder to move -axially relative to the optical disk. Further, a server is provided and adapted to control the single-axis displacement devices to adjust the posture of the lens holder subject to the distance between each detection point and the optical disk measured, keeping the parallelism between the SIL and the optical disk within a predetermined level.

DETAILED DESCRIPTION OF THE PREFERRED EMBODIMENT

Figure 1:
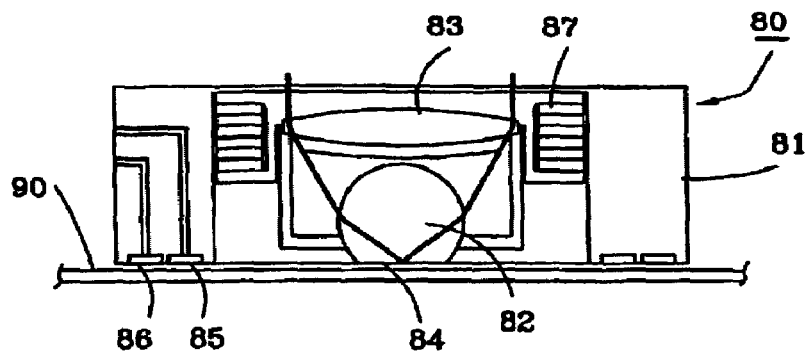
FIG. 1 is a sectional view showing a near-field flying head structure according to the prior art.
Figure 2:
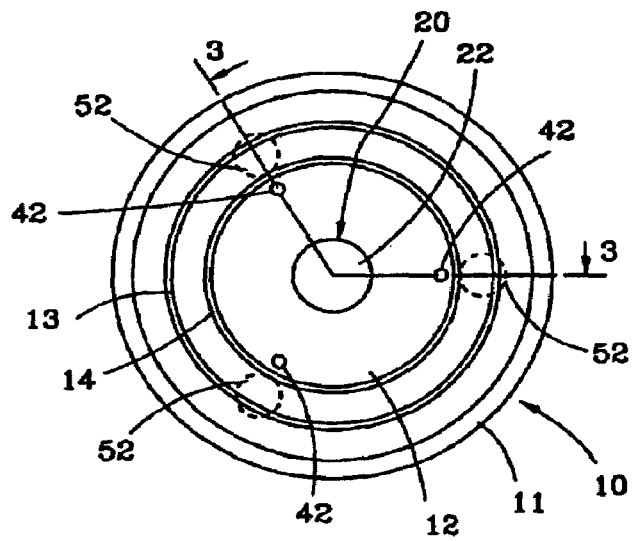
FIG. 2 is a bottom view of a SIL near-field flying head flying state control structure according to the present invention.
Figure 3:
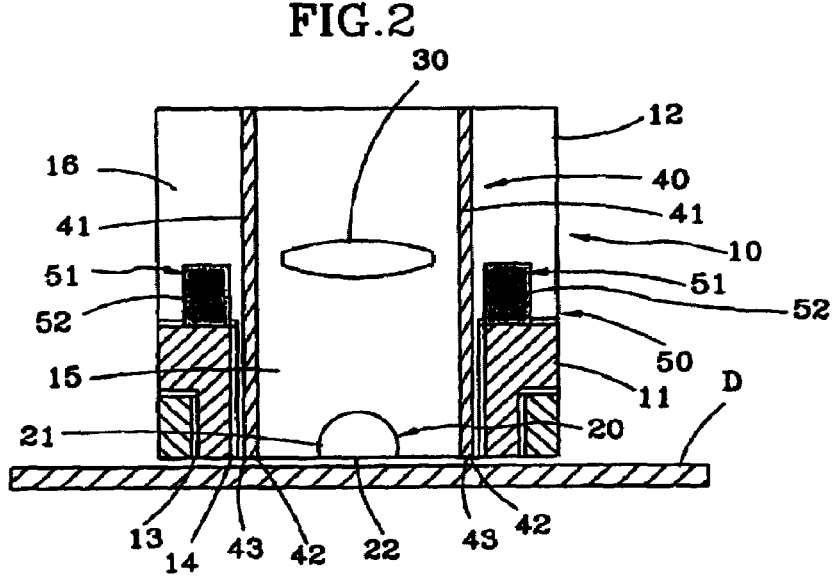
FIG. 3 is a sectional view taken along line 3—3 of FIG. 2 showing the operation of the SIL near-field flying head flying state control structure.

Referring to FIGS. 2 and 3, a SIL (solid immersion lens) near-field flying head flying state control structure in accordance with the present invention is shown comprising a slider 10, a SIL (solid immersion lens) 20, a focusing lens 30, a distance detection unit 40, a posture control unit 50, and a server (not shown).

The slider 10 is shaped like a barrel comprising a base 11 and a lens holder 12. The base 11 is an annular member located on the front outer side of the slider 10 (the bottom side in FIG. 3), having an outer air passage 13 and an inner air passage 14 arranged in a concentric manner to achieve the functioning of enabling the base 11 to fly above the surface of the optical disk D at a very low altitude by means of aerodynamics as what the prior art design did (the so-called "air pad"). The lens holder 12 is a stepped cylindrical member having a front small diameter section 15 and a rear big diameter section 16. The front small diameter section 15 is located on the center of the annular base 11. The rear big diameter section 15 is located on the rear side of the annular base 11 (the topside in FIG. 3). The lens holder 12 can be biased relative to the base 11 (this will be described latter).

The SIL 20 is a semispherical lens fixedly fastened to the center of the front side of the lens holder 12, keeping the spherical face 12 on the inside and the tangent plane 22 on the outside in flush with the front side of the lens holder 12.

The focusing lens 30 is fixedly positioned in an inner side of the lens holder 12, and adapted to focus the laser beam on the SIL 20 (because the generation and control of the laser beam are of the known art and not within the scope of the claims of the present invention, no further detailed description is necessary in this regard).

The distance detection unit 40 comprises three electrically conductive wires 41 made of metal and embedded in the lens holder 12. The conductive wires 41 each have a front end respectively extended to the front side of the lens holder 12, forming a respective detection point 42. As illustrated in FIG. 2, the three detection points 42 are equiangularly equiradially spaced around the center of the SIL 20 (strictly speaking, the detection points 42 are equiangularly spaced around the optical axis of the lens set) outside the tangent plane 22. Because the distance between the lens holder 12 and the surface of the optical disk D is very short during working of the flying head and the reflective layer (normally formed of aluminum) of the optical disk D is electrically conductive, a capacitance exists between every detection point 42 and the optical disk D. The distance detection unit 40 further comprises a detecting circuit (no shown) connected to the three conductive wires 41 to measure the capacitance between every detection point 42 and the optical disk D, so as to determine the distance between every detection point 42 and the optical disk D. Because the capacitance value between every detection point 42 and the optical disk D is indirectly proportional to the distance between the respective detection point 42 and the optical disk D, the distance between every detection point 42 and the optical disk D can easily be obtained when the corresponding capacitance value is known (Theoretically, the capacitance value is indicative of the distance, therefore it is not necessary to convert the capacitance value into distance in actual practice). According to the present preferred embodiment, electrically conducting films 43 are coated on the front side of the lens holder 12 and respectively covered on the exposed front ends of the conductive wires 41 to increase the detection area for easy measuring of the respective capacitance values. The electrically conducting films 43 are equal in area and thickness.

The posture control unit 50 comprises three single-axis displacement devices 51 provided between the base 11 of the slider 10 and the lens holder 12. According to the present preferred embodiment, every single-axis displacement device 51 is respectively formed of a deformation block 52 of piezoelectric material. The front and rear sides of each deformation block 52 are respectively connected to the rear side of the base 11 and the front side of the big diameter section 16 of the lens holder 12. The amount of axial deformation can reach several micro-millimeters. Further, as shown in FIG. 2, the three deformation blocks 52 are equiangularly spaced around the aforesaid optical axis corresponding to the three detection points 42 respectively. The posture control unit 50 can apply different voltages to the deformation blocks 52, causing every deformation block 52 to deform to a predetermined extent respectively, so that the lens holder 12 and the base 11 are moved in direction substantially parallel to the optical axis (the vertical direction in FIG. 3), and the posture of the lens holder 12 relative to the base 11 is controlled.

The aforesaid server determines the direction and amount of tilting of the tangent plane 22 of the SIL 20 relative to the optical disk D subject to the distance between every detection point 42 and the surface of the optical disk D detected by the distance detection unit 40, and commands the corresponding single-axis displacement device 51 of the posture control unit 50 to adjust the position of the corresponding side of the lens holder 12 and the base 11, so as to control the parallelism between the tangent plane 22 of the SIL 20 and the surface of the optical disk D within a predetermined level.

The functioning and effect of the SIL near-field flying head flying state control structure are described hereinafter. When running near-field recording, the base 11 of the slider 10 floats in the air at a predetermined altitude above the optical disk D, keeping the front side of the base 11 substantially in parallel to the surface of the optical disk D. During working, the distance detection unit 40 detects the capacitance values of the three detection points 42 (which are indicative of the distances between the detection points 42 and the surface of the optical disk D), for enabling the server to determine the direction and amount of tilting of the front side of the lens holder 12 (i.e., the tangent plane 22 of the SIL 20) relative to the surface of the optical disk D. If the capacitance value of one detection point surpasses the capacitance values of the other two detection points, it means that the corresponding side of the tangent plane 22 has been tilted toward the optical disk D. The tangent plane 22 is maintained in parallel to the surface of the optical disk D only when the capacitance values of the three detection points 42 are equal. The server controls the single-axis displacement devices 51 subject to the difference among the capacitance values of the three detection points 42. In short, when the capacitance value of one detection point 42 was excessively high, the server commands the posture control unit 50 to increase the voltage to the corresponding deformation block 52, causing it to extend in axial direction (or to reduce the voltage to the other two deformation blocks, causing them to contract in axial direction), and therefore the lens holder 12 is moved to retract the side tilted toward the optical disk D and to correct its tilting posture, keeping the parallelism between the tangent plane 22 of the SIL 20 and the surface of the optical disk D within a predetermined level.

While only one embodiment of the present invention has been shown and described, it will be understood that various modifications can be made thereunto without departing from the spirit of the present invention. For example, the distance detection unit can detect the distance between every lateral side of the SIL and the surface of the optical disk by means of measuring the resistance value between the detection points and the optical disk, or by means of the application of a laser beam. The arrangement of three equiangularly spaced detection points is the most simple mechanism design, however it is not a limitation. Further, the single-axis displacement devices of the posture control unit are not confined to piezoelectric material. The number and positions of the single-axis displacement devices may be changed.

As indicated above, the SIL near-field flying head flying state control structure constantly keeps the SIL and the optical disk in a high parallelism, so as to achieve a stable and accurate exposure operation and to prevent the lens from contact the optical disk. Further, because the parallelism is adjusted during near-field recording when required, the precision requirement of the relative positioning among the component parts is less critical. Therefore the SIL near-field flying head flying state control structure is easy to assemble.

The invention claimed is:

1. A SIL (solid immersion lens) near-field flying head flying state control structure for controlling a flying head to perform near-field recording on an optical disk, comprising
    a slider;
    a semispherical SIL (solid immersion lens) located on a front side of said slider, said SIL having a spherical face and a tangent plane facing said optical disk;
    a focusing lens provided in said slider corresponding to the spherical face of said SIL;
    wherein said slider has a base to be maintained at a distance in close proximity to said optical disk, and a lens holder for holding said SIL and said focusing lens, said lens holder being capable of biasing elative to said base;
    a distance detection unit having at least three detection points disposed in a front side of said lens holder around the tangent plane of said SIL for enabling said distance detection unit to detect the distance between each of said at least three detection points and said optical disk;
    a posture control unit having a plurality of single-axis displacement devices provided between the base and lens holder of said slider for controlling relative movement between said lens holder and said base in direction parallel to the optical axis of said SIL, so as to further achieve control of the posture of said lens holder relative to said base; and
    a server adapted to determine the direction and amount of tilting of the tangent plane of said SIL relative to said optical disk subject to the distance between every of said detection points and said optical disk detected by said distance detection unit, and to command said single-axis displacement devices of said posture control unit to adjust the relative position between said lens holder and said base subject to the direction and amount of tilting of the tangent plane of said SIL relative to said optical disk, keeping the parallelism between the tangent plane of said SIL and said optical disk controlled within a predetermined level.

2. The SIL near-field flying head flying state control structure as claimed in claim 1, wherein said distance detection unit determines the distance between each of said detection points and said optical disk by measuring the capacitance value between the respective detection point and said optical disk.

3. The SIL near-field flying head flying state control structure as claimed in claim 1, wherein said single-axis displacement devices each are comprised of a deformation block made of piezoelectric material, the deformation blocks of said single-axis displacement devices each having a front and rear sides respectively connected to said lens holder and said base.

4. The SIL near-field flying head flying state control structure as claimed in claim 3, wherein said base has an annular shape; said lens holder is a stepped cylindrical member having a front small diameter section located on the center of said base, and a rear big diameter section located on a rear side of said base; the front and rear sides of the deformation blocks of said single-axis displacement devices are respectively connected to the rear side of said base and a front side of said rear big diameter section.

5. The SIL near-field flying head flying state control structure as claimed in claim 1, wherein said distance detection unit comprises at least three conductive wires respectively mounted in said lens holder, said at least three conductive wires each having a front end disposed in flush with the front side of said lens holder and forming one of said detection points.

6. The SIL near-field flying head flying state control structure as claimed in claim 5, wherein said lens holder comprises a plurality of electrically conducting films coated on the front side thereof and respectively covered on the front ends of said at least three conductive wires.

7. The SIL near-field flying head flying state control structure as claimed in claim 1, wherein said detection points are equiangularly equiradially spaced around the optical axis of said SIL.

8. The SIL near-field flying head flying state control structure as claimed in claim 1, wherein said single-axis displacement devices are equiangularly equiradially spaced around the optical axis of said SIL.

9. The SIL near-field flying head flying state control structure as claimed in claim 1, wherein the number and positions of said single-axis displacement devices correspond to the number and positions of said detection points.

10. The SIL near-field flying head flying state control structure as claimed in claim 1, wherein said base of said slider is maintained at the distance in close proximity to said optical disk by aerodynamics.

* * * * *